United States Patent
Masumi et al.

(10) Patent No.: US 8,873,196 B2
(45) Date of Patent: Oct. 28, 2014

(54) BASE PLATE MADE OF MATERIALS WHICH HAVE A DIFFERENT YOUNG'S MODULUS, BASE UNIT, MOTOR, DISK DRIVE APPARATUS AND METHOD OF MANUFACTURING THE BASE PLATE

(71) Applicant: Nidec Corporation, Kyoto (JP)

(72) Inventors: Yuki Masumi, Kyoto (JP); Junzo Fujinawa, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/789,974

(22) Filed: Mar. 8, 2013

(65) Prior Publication Data

US 2013/0335860 A1    Dec. 19, 2013

Related U.S. Application Data

(60) Provisional application No. 61/662,431, filed on Jun. 21, 2012.

(30) Foreign Application Priority Data

Jun. 19, 2012    (JP) ................. 2012-138069

(51) Int. Cl.

| | |
|---|---|
| *G11B 17/02* | (2006.01) |
| *G11B 33/12* | (2006.01) |
| *H02K 5/02* | (2006.01) |
| *H02K 11/00* | (2006.01) |
| *B22D 25/02* | (2006.01) |
| *H02K 5/167* | (2006.01) |
| *H02K 5/22* | (2006.01) |
| *B22D 19/04* | (2006.01) |
| *H02K 5/08* | (2006.01) |

(52) U.S. Cl.
CPC ............. *H02K 5/02* (2013.01); *H02K 11/0073* (2013.01); *B22D 25/02* (2013.01); *H02K 5/1675* (2013.01); *H02K 5/225* (2013.01); *B22D 19/04* (2013.01); *H02K 5/08* (2013.01)
USPC ...................................... 360/98.07; 360/99.08

(58) Field of Classification Search
USPC ............. 360/98.07, 99.08, 97.11; 310/51, 91, 310/418, 425
See application file for complete search history.

(56) References Cited

U.S. PATENT DOCUMENTS 4,814,914 A * 3/1989 Hagiwara et al. .......... 360/98.08
5,479,304 A * 12/1995 Morita ....................... 360/98.07
(Continued)

FOREIGN PATENT DOCUMENTS

| JP | 05-207717 A | 8/1993 |
|---|---|---|
| JP | 05-070184 U | 9/1993 |

(Continued)

OTHER PUBLICATIONS

Sekii et al., "Motor and Disk Drive Apparatus", U.S. Appl. No. 13/564,934, filed Aug. 2, 2012.

(Continued)

*Primary Examiner* — Jefferson Evans
(74) *Attorney, Agent, or Firm* — Keating & Bennett, LLP

(57) ABSTRACT

A base plate of a disk drive apparatus includes a motor base disposed around a central axis and a base body portion extending radially outward of the motor base. The motor base is made of a metallic material of a first type. The base body portion is made of a metallic material of a second type. The base body portion is a casting product in which the motor base is an insert component. An upper protruding portion and a lower protruding portion are defined in one of an outer end portion of a bottom plate portion of the motor base and an inner end portion of the base body portion.

14 Claims, 16 Drawing Sheets

(56) References Cited

U.S. PATENT DOCUMENTS

| | | | |
|---|---|---|---|
| 5,528,092 A * | 6/1996 | Ohta | 310/67 R |
| 6,034,841 A * | 3/2000 | Albrecht et al. | 360/99.17 |
| 6,091,579 A * | 7/2000 | Suzuki | 360/264.8 |
| 7,012,191 B1 | 3/2006 | Watanabe et al. | |
| 7,122,922 B2 * | 10/2006 | Xu et al. | 310/51 |
| 8,120,872 B2 | 2/2012 | Sekii et al. | |
| 8,363,352 B2 | 1/2013 | Kang | |
| 8,587,896 B1 * | 11/2013 | Ishino et al. | 360/99.08 |
| 8,667,667 B1 | 3/2014 | Nguyen et al. | |
| 2006/0138886 A1 | 6/2006 | Ito et al. | |
| 2006/0265871 A1 | 11/2006 | Ito et al. | |
| 2007/0247010 A1 | 10/2007 | Ichizaki | |
| 2007/0278880 A1 | 12/2007 | Wada et al. | |
| 2007/0292060 A1 * | 12/2007 | Kusaka et al. | 384/107 |
| 2008/0019038 A1 | 1/2008 | Xu et al. | |
| 2008/0084142 A1 | 4/2008 | Ino et al. | |
| 2010/0177627 A1 | 7/2010 | Ino et al. | |
| 2011/0002212 A1 * | 1/2011 | Tashiro et al. | 369/75.11 |
| 2011/0309724 A1 * | 12/2011 | Min et al. | 310/425 |
| 2011/0317310 A1 * | 12/2011 | Kim et al. | 360/99.08 |
| 2012/0200957 A1 | 8/2012 | Yawata | |
| 2013/0290988 A1 * | 10/2013 | Watson et al. | 720/600 |
| 2013/0335859 A1 * | 12/2013 | Tatsumi et al. | 360/99.08 |

FOREIGN PATENT DOCUMENTS

| | | |
|---|---|---|
| JP | 05-316704 A | 11/1993 |
| JP | 06-343242 A | 12/1994 |
| JP | 08-033253 A | 2/1996 |
| JP | 08-237899 A | 9/1996 |
| JP | 08-275439 A | 10/1996 |
| JP | 10-108424 A | 4/1998 |
| JP | 2003-153481 A | 5/2003 |
| JP | 2005-253239 A | 9/2005 |
| JP | 2007-295666 A | 11/2007 |
| JP | 2008-005588 A | 1/2008 |
| JP | 2008-092714 A | 4/2008 |
| JP | 2009-110611 A | 5/2009 |
| JP | 2011-114892 A | 6/2011 |
| JP | 2012-005339 A | 1/2012 |

OTHER PUBLICATIONS

Saeki et al., "Spindle Motor and Disk Drive Apparatus", U.S. Appl. No. 13/767,228, filed Feb. 14, 2013.
Saeki et al.,"Base Unit", U.S. Appl. No. 13/770,374, filed Feb. 19, 2013.
Fujinawa et al., "Base Member, Motor, and Disk Drive Apparatus", U.S. Appl. No. 13/770,395, filed Feb. 19, 2013.
Matsumoto et al., "Base Unit, Motor and Disk Drive Apparatus", U.S. Appl. No. 13/770,355, filed Feb. 19, 2013.
Saeki et al., "Stopper, Motor, and Disk Drive Apparatus", U.S. Appl. No. 13/767,194, filed Feb. 14, 2013.
Tamaoka et al., "Motor and Disk Drive Apparatus", U.S. Appl. No. 13/564,900, filed Aug. 2, 2012.
Tatsumi et al., "Base Plate, Base Unit, Motor and Disk Drive Apparatus", U.S. Appl. No. 13/788,140, filed Mar. 7, 2013.
Shiraishi et al., "Motor and Disk Drive Apparatus", U.S. Appl. No. 13/783,733, filed Mar. 4, 2013.
Sato et al., "Spindle Motor and Disk Drive Apparatus", U.S. Appl. No. 13/780,447, filed Feb. 28, 2013.
Matsumoto et al., "Spindle Motor and Disk Drive Apparatus", U.S. Appl. No. 13/792,448, filed Mar. 11, 2013.
Matsumoto et al., "Spindle Motor and Disk Drive Apparatus", U.S. Appl. No. 13/792,400, filed Mar. 11, 2013.
Matsumoto et al., "Base Unit, Motor and Disk Drive Apparatus", U.S. Appl. No. 13/785,194, filed Mar. 5, 2013.
Matsumoto et al.,"Spindle Motor and Disk Drive Apparatus", U.S. Appl. No. 13/798,842, filed Mar. 13, 2013.
Sato et al., "Spindle Motor and Disk Drive Apparatus", U.S. Appl. No. 13/798,827, filed Mar. 13, 2013.
Ishino et al., "Motor and Disk Drive Apparatus", U.S. Appl. No. 13/794,864, filed Mar. 12, 2013.

* cited by examiner

BASE PLATE MADE OF MATERIALS WHICH HAVE A DIFFERENT YOUNG'S MODULUS, BASE UNIT, MOTOR, DISK DRIVE APPARATUS AND METHOD OF MANUFACTURING THE BASE PLATE

BACKGROUND OF THE INVENTION

1. Field of the Invention

The present invention relates to a base plate, a base unit, a motor, a disk drive apparatus, and a method of manufacturing the base plate.

2. Description of the Related Art

Hitherto, a disk drive apparatus such as a hard disk drive has been known. A motor for rotating a disk is mounted in the disk drive apparatus. The conventional disk drive apparatus is disclosed, for example, in Japanese Patent Application Publication No. 2012-005339. The disk drive apparatus includes a base that supports all the components of the motor (see paragraph 0031 and FIG. 1 of Japanese Patent Application Publication No. 2012-005339).

In recent years, the demand for thin notebook PCs or tablet PCs has been increased. Accordingly, it is also necessary to make a disk drive apparatus mounted in such a PC thinner than the past. In order to make the disk drive apparatus thin, it is preferable to reduce the axial thickness of a base plate that supports the motor. In particular, motor components such a stator and a hub should be arranged around a central axis of the motor. Thus, it is preferably to particularly reduce the axial thickness of the base plate in a lower side of the motor components.

However, if the axial thickness of the base plate is reduced, the stiffness of the base plate is weakened. If the stiffness of the base plate is weakened, vibration and noise due to driving of the motor are increased. Further, the position of the disk becomes unstable, and errors in reading and writing of data easily occur.

SUMMARY OF THE INVENTION

A first preferred embodiment of the present invention includes a base plate of a disk drive apparatus which rotates a disk centered on a central axis which extends vertically. The base plate includes a motor base and a base body portion. The motor base is disposed around the central axis and is made of a metallic material of a first type. The base body portion extends radially outward of the motor base and is made of a metallic material of a second type. A Young's modulus of the metallic material of the first type is larger than a Young's modulus of the metallic material of the second type. The base body portion is preferably a casting product in which the motor base is provided as an insert component. The motor base includes a bearing mounting portion and a bottom plate portion. The bearing mounting portion preferably has a cylindrical or an approximately cylindrical shape which axially extends around the central axis. The bottom plate portion extends radially outward from a lower portion of the bearing mounting portion. One of an outer end portion of the bottom plate portion and an inner end portion of the base body portion which is in contact with the outer end portion includes an upper protruding portion and a lower protruding portion. The upper protruding portion is in contact with an upper surface of the other of the outer end portion of the bottom plate portion and the inner end portion of the base body portion. The lower protruding portion is in contact with a lower surface of the other of the outer end portion of the bottom plate portion and the inner end portion of the base body portion.

A second preferred embodiment of the present invention provides a method of manufacturing a base plate used in a disk drive apparatus. The method of manufacturing a base plate includes the steps of preparing a motor base formed of a metallic material of a first type; disposing the motor base in a mold; and injecting a melted metallic material of a second type into a space in the mold radially outside of the motor base such that a base body portion, which is a casting product, is obtained. A Young's modulus of the metallic material of the first type is larger than a Young's modulus of the metallic material of the second type after being cured.

According to the first preferred embodiment of the invention, the motor base which is disposed radially inside the base body portion is made of the metallic material of the first type having a Young's modulus larger than that of the metallic material of the second type which defines the base body portion. Thus, the axial thickness of the portion of the base plate in the vicinity of the central axis can be significantly reduced, and deterioration of the stiffness of the portion can be prevented. Further, extraction of the motor base in the axial direction can be prevented by the upper protruding portion and the lower protruding portion.

According to the second preferred embodiment of the invention, a base plate, in which the axial thickness of the portion in the vicinity of the central axis can be significantly reduced and deterioration of the stiffness of the portion can be prevented, can be manufactured by insert casting.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described referring to the accompanying drawings. In this description, a direction parallel to a central axis of a motor is referred to as an "axial direction", a direction orthogonal to the central axis of the motor is referred to as a "radial direction", and a direction along an arc around the central axis of the motor is referred to as a "circumferential direction", respectively.

Further, in this description, assuming that the axial direction is an up-and-down direction and the position of a stator with respect to a base plate is upward, the shapes and positional relationship of respective components will be described. Here, the definition of the vertical direction does not limit a direction when the base plate, a base unit, a motor, and a disk drive apparatus according to preferred embodiments of the present invention are manufactured or used.

Further, in this description, the phrase "parallel direction" includes both a parallel direction and a substantially parallel direction. Further, in this description, the phrase "orthogonal direction" includes both an orthogonal direction and a substantially orthogonal direction.

Figure 1:
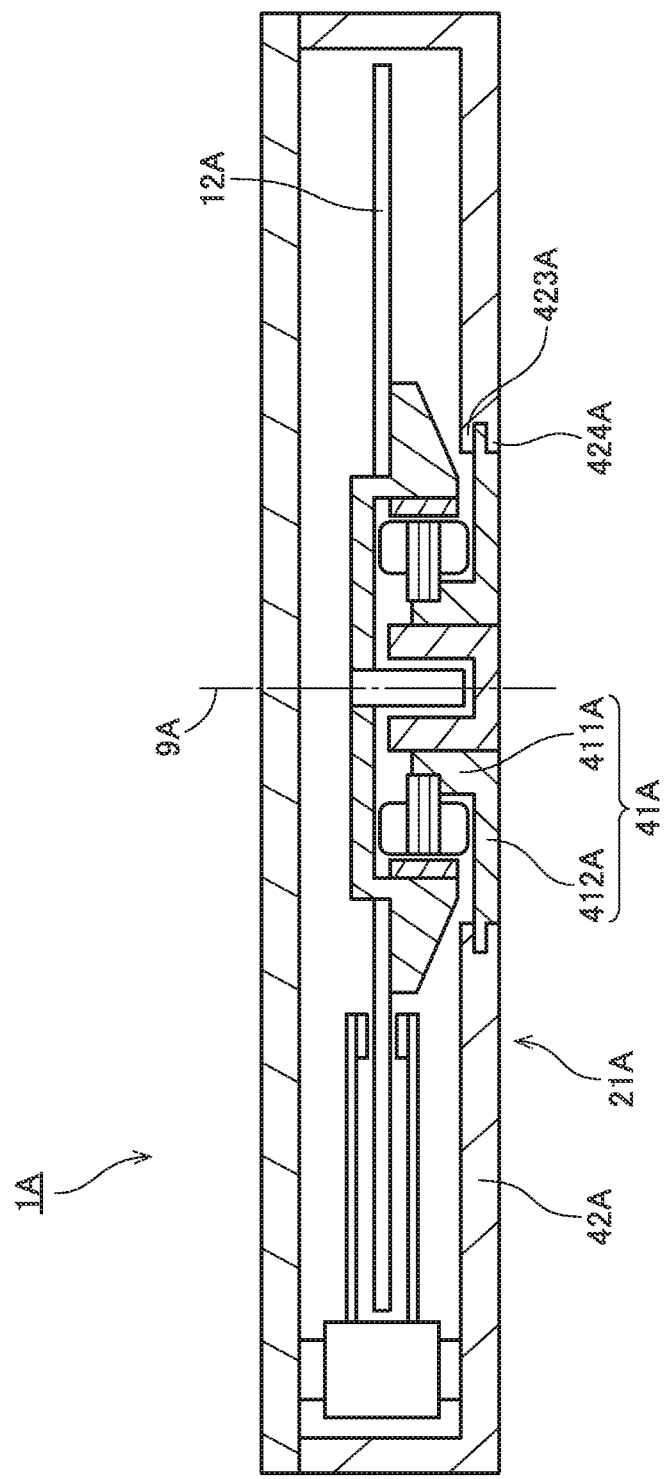
FIG. 1 is a longitudinal sectional view of a disk drive apparatus according to a first preferred embodiment of the present invention.

FIG. 1 is a longitudinal sectional view of a disk drive apparatus 1A according to a first preferred embodiment of the present invention. The disk drive apparatus 1A rotates a disk 12A around a central axis 9A that extends vertically. As shown in FIG. 1, a base plate 21A of the disk drive apparatus 1A preferably includes a motor base 41A and a base body portion 42A.

The motor base 41A is disposed around the central axis 9A. The motor base 41A preferably includes a bearing mounting portion 411A and a bottom plate portion 412A. The bearing mounting portion 411A axially extends in a cylindrical or an approximately cylindrical shape around the central axis 9A. The bottom plate portion 412A extends radially outward from a lower portion of the bearing mounting portion 411A. The base body portion 42A is preferably a casting product in which the motor base 41A is provided as an insert component. The base body portion 42A extends radially outward of the motor base 41A. An outer end portion of the bottom plate portion 412A is in contact with an inner end portion of the base body portion 42A.

The motor base 41A is preferably made of a metallic material of a first type. The base body portion 42A is preferably made of a metallic material of a second type. The Young's modulus of the metallic material of the first type is larger than the Young's modulus of the metallic material of the second type. That is, in the base plate 21A, the motor base 41A disposed farther radially inward than the base body portion 42A is made of the metallic material of the first type having the Young's modulus larger than that of the metallic material of the second type that defines the base body portion 42A. Thus, the axial thickness of a portion in the vicinity of the central axis 9A of the base plate 21A can be significantly reduced and deterioration of the stiffness of the portion can be prevented.

Further, in this preferred embodiment, an upper protruding portion 423A and a lower protruding portion 424A are preferably provided in the inner end portion of the base body portion 42A. The upper protruding portion 423A is in contact with an upper surface of the outer end portion of the bottom plate portion 412A. The lower protruding portion 424A is in contact with a lower surface of the outer end portion of the bottom plate portion 412A. Thus, extraction of the motor base 41A in the axial direction is prevented by the upper protruding portion 423A and the lower protruding portion 424A.

The upper protruding portion and the lower protruding portion may alternatively be provided to the motor base 41A. That is, the upper protruding portion and the lower protruding portion may be provided in the outer end portion of the bottom plate portion 412A, and the upper protruding portion and the lower protruding portion may be in contact with an upper surface and a lower surface of the inner end portion of the base body portion 42A, respectively.

Figure 2:
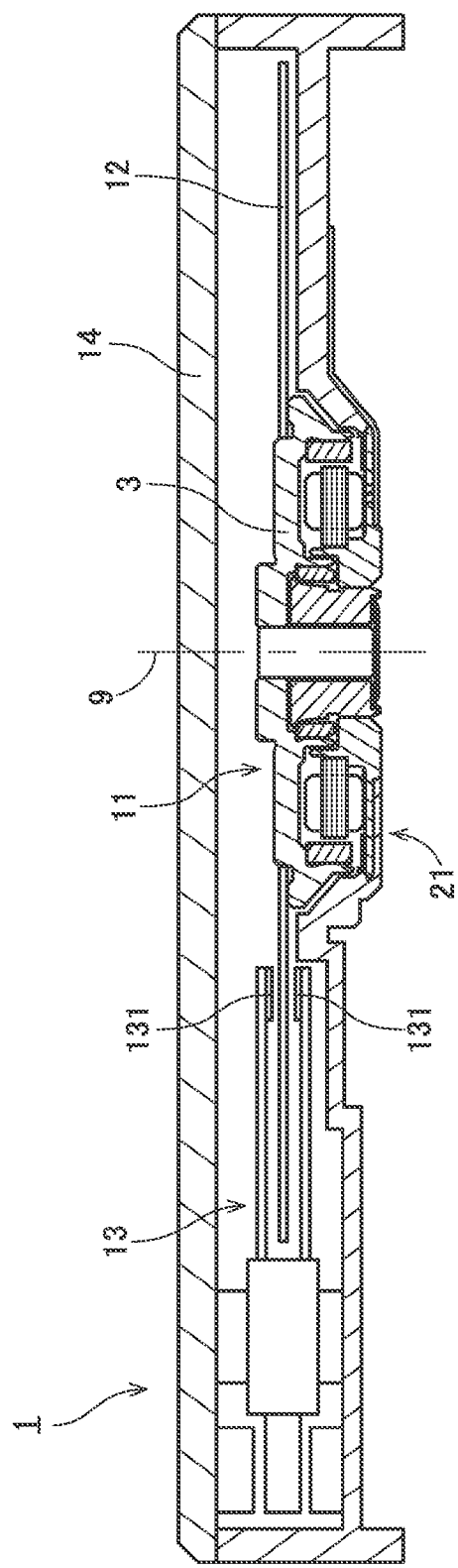
FIG. 2 is a longitudinal sectional view of a disk drive apparatus according to a second preferred embodiment of the present invention.

FIG. 2 is a longitudinal sectional view of a disk drive apparatus 1 according to a second preferred embodiment of the present invention. The disk drive apparatus 1 rotates a magnetic disk 12 to perform reading and/or writing of information from or to the magnetic disk 12. As shown in FIG. 2, the disk drive apparatus 1 preferably includes a motor 11, the magnetic disk 12, an access portion 13, and a cover 14.

The motor 11 supports the magnetic disk 12, and, at the same time, rotates the magnetic disk 12 centered on a central axis 9. The motor 11 preferably includes a base plate 21 that extends in a direction orthogonal to the central axis 9. Further, an upper portion of the base plate 21 is preferably covered by the cover 14. A rotating portion 3, the magnetic disk and the access portion 13 of the motor 11 are accommodated inside a casing defined by the base plate 21 and the cover 14. The access portion 13 moves a head 131 along a recording surface of the magnetic disk 12 to perform reading and/or writing of information from or to the magnetic disk 12.

The disk drive apparatus 1 may include two or more magnetic disks 12, for example. Further, the access portion 13 may perform only one of reading and writing of information from or to the magnetic disk 12.

Figure 3:
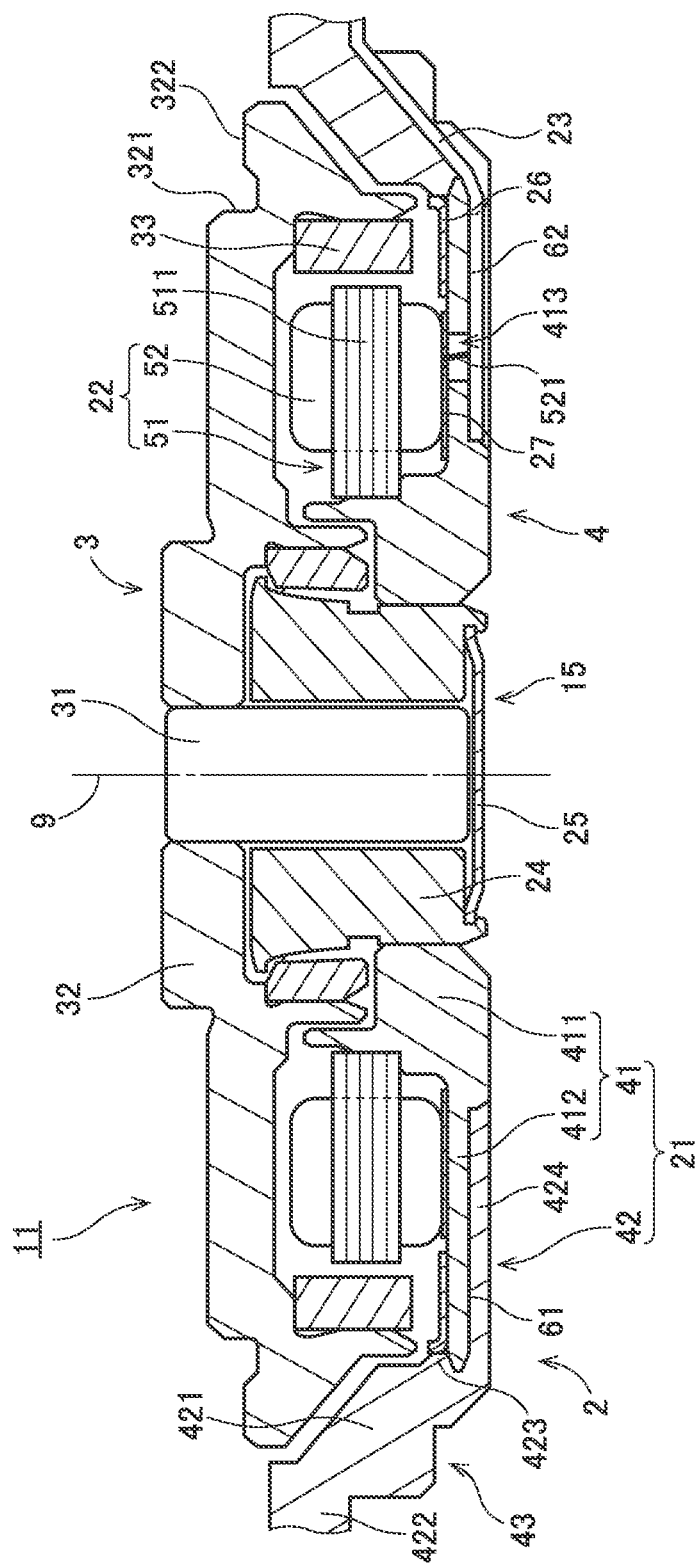
FIG. 3 is a longitudinal sectional view of a motor according to the second preferred embodiment of the present invention.

Subsequently, a detailed configuration of the motor 11 will be described. FIG. 3 is a longitudinal sectional view of the motor 11. As shown in FIG. 3, the motor 11 includes a stationary portion 2 and a rotating portion 3. The stationary portion 2 is relatively stationary with respect to the base plate 21. The rotating portion 3 is rotatably supported with respect to the stationary portion 2.

The stationary portion 2 of this preferred embodiment preferably includes the base plate 21, a stator 22, a circuit board 23, a sleeve 24, and a cap 25.

The base plate 21 extends in a direction orthogonal to the central axis 9 in the lower side of the rotating portion 3. The base plate 21 of the motor 11 is preferably defined by two components, which are a motor base 41 and a base body portion 42.

The motor base 41 has an annular shape which is disposed farther radially inward than the base body portion 42. The motor base 41 of this preferred embodiment is made of, for example, stainless steel which corresponds to a metallic material of a first type. As shown in FIG. 3, the motor base 41 preferably includes a bearing mounting portion 411 and an inner bottom plate portion 412. The bearing mounting portion 411 axially extends in a cylindrical or an approximately cylindrical shape around the central axis 9. The inner bottom plate portion 412 extends radially outward, in a circular or approximately circular plate shape, from a lower portion of the bearing mounting portion 411.

The base body portion 42 is disposed radially outside the motor base 41. The base body portion 42 of this preferred embodiment is preferably made of, for example, aluminum which is a metallic material of a second type. The base body portion 42 includes an inclined portion 421 and an outer bottom plate portion 422. The inclined portion 421 extends radially outward and upward in the radially outer side of the inner bottom plate portion 412. The outer bottom plate portion 422 extends radially outward from an outer end portion of the inclined portion 421.

The inner bottom plate portion 412 and the inclined portion 421 preferably define an accommodating portion 43 having an approximate cup shape which is opened upward. A stator 22 and a portion of the rotating portion 3 are accommodated in the accommodating portion 43. Thus, the outer bottom plate portion 422 is disposed at substantially the same vertical position as those of the stator 22 and the portion of the rotating portion 3. As a result, the total axial dimension of the disk drive apparatus 1, radially outside of the accommodating portion 43, is substantially reduced.

Further, a magnetic component 26 that is a magnetic body of an annular shape is preferably disposed on an upper surface of the inner bottom plate portion 412. The magnetic component 26 is disposed in the lower side of a magnet 33 which will be described later. An attractive magnetic force is generated between the magnetic component 26 and the magnet 33. Thus, the rotating portion 3 is attracted to the stationary portion 2.

The stator 22 preferably includes a stator core 51 and a plurality of coils 52. The stator core 51 is preferably defined by a laminated steel member in which electromagnetic steel plates such as, for example, silicon steel plates are laminated in the axial direction. The stator core 51 is fixed to an outer circumferential surface of the bearing mounting portion 411. Further, the stator core 51 includes a plurality of teeth 511 that protrude radially outward. The coils 52 are constituted by conducting wires wound around the respective teeth 511.

The stator core 51 and the coils 52 are disposed above the inner bottom plate portion 412. An insulating sheet 27 is interposed between the coils 52 and the inner bottom plate portion 412. Thus, the coils 52 and the motor base 41 are electrically insulated. Further, because the insulating sheet 27 is disposed therebetween, the inner bottom plate portion 412 and the coils 52 are able to be positioned close to each other in the axial direction. Thus, the axial thickness of the motor 11 is further reduced.

The coils 52 according to this preferred embodiment preferably include three conducting wires 521, respectively, arranged to supply each of three-phases of alternating current. An end portion of each conducting wire 521 that extends from the coils 52 reaches a lower surface of the inner bottom plate portion 412 through a drawing hole 413 defined in the inner bottom plate portion 412.

A circuit board 23 is preferably fixed to a lower surface of the base plate 21, for example, with an adhesive. An electric circuit arranged to supply a driving current to the coils 52 is mounted on the circuit board 23. The conducting wire 521 drawn from the drawing hole 413 is electrically connected to the electric circuit on the circuit board 23. The driving current of the motor 11 is supplied from an external power source to the coils 52 through the circuit board 23.

A flexible printed circuit board capable of easily being bent is preferably used as the circuit board 23 according to this preferred embodiment. If the flexible printed circuit board is used, the circuit board 23 may be disposed along concavities and convexities of the lower surface of the base plate 21. Further, if the flexible printed circuit board is used, the axial thickness of the circuit board 23 can be minimized. Accordingly, the axial thickness of the motor 11 can further be reduced.

In this preferred embodiment, the base unit 4 is preferably defined by the base plate 21, the stator 22, and the circuit board 23.

A sleeve 24 axially extends in a cylindrical or an approximately cylindrical shape around a shaft 31 which will be described later. A lower portion of the sleeve 24 is accommodated radially inside the bearing mounting portion 411, and is fixed to the bearing mounting portion 411, for example, with an adhesive. An inner circumferential surface of the sleeve 24 radially faces an outer circumferential surface of the shaft 31. Further, a lower opening of the sleeve 24 is blocked by a cap 25.

The rotating portion 3 according to this preferred embodiment preferably includes the shaft 31, a hub 32, and the magnet 33.

The shaft 31 axially extends in the inner side of the sleeve 24. Metal such as, for example, stainless steel is preferably used as a material of the shaft 31. An upper end portion of the shaft 31 protrudes farther upward from the upper surface of the sleeve 24. Further, a lubricating fluid is interposed between the sleeve 24 and the cap 25, and the shaft 31. For example, a polyol ester-based oil or a diester-based oil may preferably be used as the lubricating fluid. The shaft 31 is rotatably supported, through the intermediary of the lubricating fluid, with respect to the sleeve 24 and the cap 25.

That is, in this preferred embodiment, a bearing mechanism 15 is preferably defined by the sleeve 24 and the cap 25 that are components of the stationary portion 2, the shaft 31 that is a component of the rotating portion 3, and the lubricating fluid interposed therebetween. The bearing mechanism is accommodated in the bearing mounting portion 411. The rotating portion 3 is supported by the bearing mechanism 15 and rotates centered on the central axis 9.

The hub 32 extends radially outward from a circumferential portion of the upper end portion of the shaft 31. An inner circumferential portion of the hub 32 is fixed to the upper end portion of the shaft 31. Further, the hub 32 preferably includes a first holding surface 321 of a cylindrical or an approximately cylindrical shape, and a second holding surface 322 that extends radially outward from a lower end portion of the first holding surface 321. The inner circumferential portion of the magnetic disk 12 is in contact with at least a portion of the first holding surface 321. Further, a lower surface of the magnetic disk 12 is in contact with at least a portion of the second holding surface 322. Thus, the magnetic disk 12 is held.

The magnet 33 is fixed to the hub 32 in the radially outer side of the stator 22. The magnet 33 of this preferred embodiment is preferably arranged in an annular shape. An inner circumferential surface of the magnet 33 radially faces end surfaces of the radially outer side of a plurality of teeth 511. Further, the N poles and the S poles are alternately magnetized in the circumferential direction in the inner circumferential surface of the magnet 33.

A plurality of magnets may alternatively be used instead of the annular magnet 33. In a case where the plurality of magnets is used, the plurality of magnets may be arranged in the circumferential direction so that the N pole and the S pole are alternately arranged.

In the above-described motor 11, if a driving current is supplied to the coils 52 through the circuit board 23, a magnetic flux is generated in the plurality of teeth 511. Further, a circumferential torque is generated due to an action of the magnetic flux between the teeth 511 and the magnet 33. Consequently, the rotating portion 3 rotates centered on the central axis 9 with respect to the stationary portion 2. The magnetic disk 12 supported by the hub 32 rotates centered on the central axis 9 together with the rotating portion 3.

Figure 4:
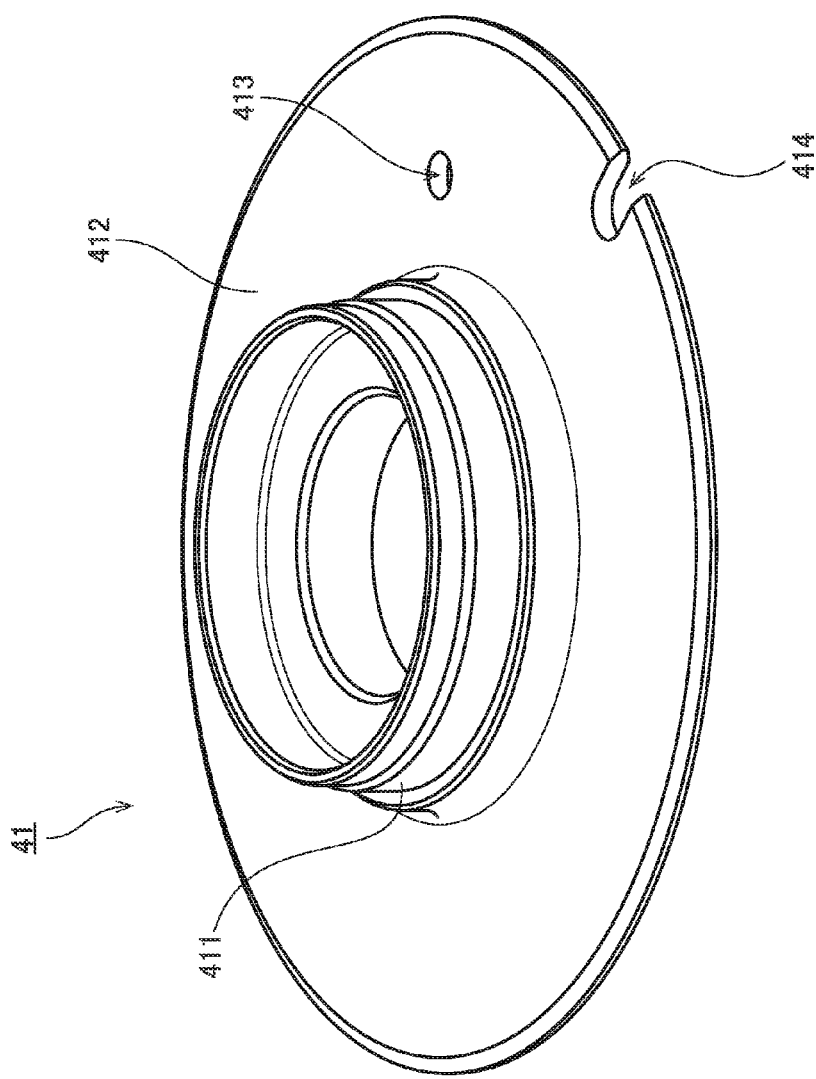
FIG. 4 is a perspective view of a motor base according to the second preferred embodiment of the present invention.
Figure 5:
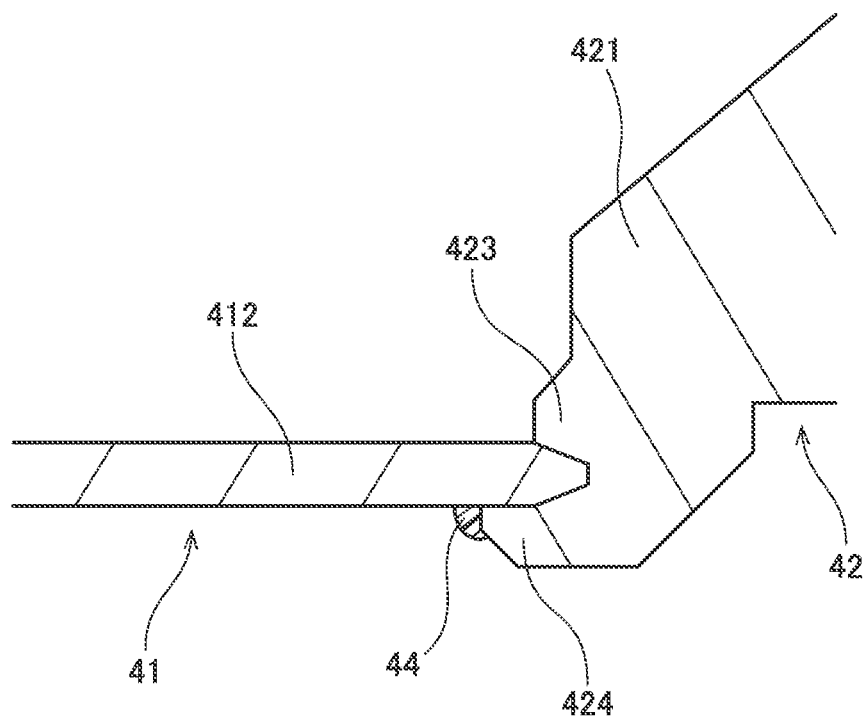
FIG. 5 is a partial longitudinal sectional view of a base plate according to the second preferred embodiment of the present invention.
Figure 6:
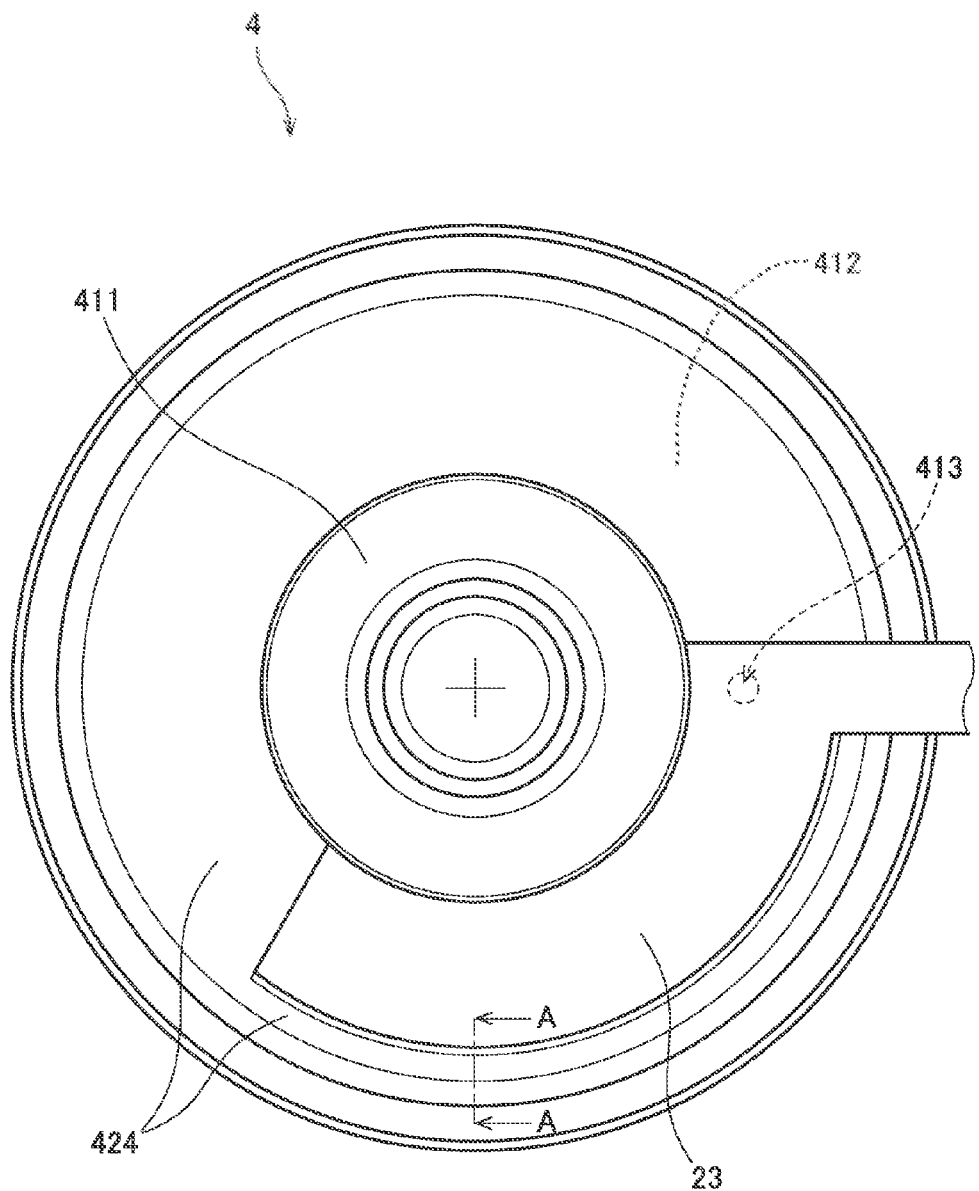
FIG. 6 is a partial bottom view a base unit according to the second preferred embodiment of the present invention.

Subsequently, a more detailed structure of the base plate 21 will be described. FIG. 4 is a perspective view of the motor base 41 according to a preferred embodiment of the present invention. FIG. 5 is a partial longitudinal sectional view of the base plate 21 in the vicinity of a boundary between the motor base 41 and the base body portion 42. FIG. 6 is a partial bottom view of the base unit 4. FIG. 5 corresponds to a cross section taken along line A-A in FIG. 6. Hereinafter, description will be appropriately made referring to FIGS. 3 to 6.

The motor base 41 is preferably obtained by, for example, cutting stainless steel that is a metallic material of a first type. A ferromagnetic stainless steel, a non-magnetic stainless steel, or the like may be used as a material of the motor base 41, for example. Specifically, an austenitic stainless steel such as SUS 303 or SUS 304, a martensitic stainless steel such as SUS 420, or a ferritic stainless steel such as SUS 430 may preferably be used. Here, as the material of the motor base 41, a different type of stainless steel may be used, or iron may be used. Further, the material of the motor base 41 may be a magnetic metal or a non-magnetic metal. Further, the motor base 41 may be formed by a process other than the cutting such as, for example, press working, forging, etc. In addition, in a case where the motor base is made of a ferromagnetic stainless steel, the magnetic component 26 may not be provided.

The base body portion 42 is preferably obtained by casting aluminum, which is a metallic material of a second type. In the casting, the motor base 41 is preferably arranged in advance in a mold, and then, melted aluminum is poured in the mold. As a result, the base body portion 42 that is a casting product in which the motor base 41 is provided as an insert component is obtained. Here, magnesium or magnesium alloy may alternatively be used as the material of the base body portion instead of the aluminum. The meaning of "aluminum" in this specification includes both of pure aluminum and also any aluminum alloy suitable for casting.

In this way, the base plate 21 of this preferred embodiment is preferably obtained by insert casting. The motor base 41 that is an insert component is disposed farther radially inward than the base body portion 42 that is a casting product. Further, the Young's modulus of stainless steel that provides the motor base 41 is larger than the Young's modulus of aluminum that provides the base body portion 42. Thus, the axial thickness of the motor base 41, that is, of a portion close to the central axis 9 of the base plate 21 can be significantly reduced, and deterioration of the stiffness of the portion can be prevented. Accordingly, the motor 11 can be made thinner in the axial direction.

If the stiffness of the motor base 41 can be secured, vibrations or noise caused due to the driving of the motor 11 can be significantly reduced and prevented. Further, since the position of the magnetic disk 12 is stabilized, errors in reading and writing of data will hardly ever occur.

As shown in FIG. 3, in this preferred embodiment, the inner end portion of the inner bottom plate portion 412 is disposed farther radially inward than the inner end portion of the coils 52. Further, the outer end portion of the inner bottom plate portion 412 is disposed farther radially outward than the outer end portion of the coils 52. Accordingly, the inner bottom plate portion 412 is arranged below the coils 52. The stiffness of the inner bottom plate portion 412 which is made of stainless steel is only barely reduced even though the inner bottom plate portion 412 has been made thin in the axial direction. Thus, by reducing the thickness of the inner bottom plate portion 412, a space where the coils 52 are arranged can be secured, and the stiffness necessary for the inner bottom plate portion 412 can be obtained. Further, by reducing the thickness of the inner bottom plate portion 412, the number of turns of the coils 52 can be increased. As the number of turns of the coils 52 increases, an output of the motor 11 increases.

As a result of the insert casting, the outer end portion of the inner bottom plate portion 412 and the inner end portion of the base body portion 42 are connected to each other, substantially without a gap therebetween. Thus, inflow and outflow of gas in the boundary between the motor base 41 and the base body portion 42 are significantly reduced and prevented. As a result, air tightness of the disk drive apparatus 1 is improved. Further, the motor base 41 and the base body portion 42 are firmly fixed by being connected to each other.

Particularly, in this preferred embodiment, as shown in FIG. 5, an upper protruding portion 423 and a lower protruding portion 424 are provided in the inner end portion of the base body portion 42. The upper protruding portion 423 is in contact with an upper surface of the outer end portion of the inner bottom plate portion 412. The lower protruding portion 424 is in contact with a lower surface of the outer end portion of the inner bottom plate portion 412. That is, the outer end portion of the inner bottom plate portion 412 is wedged between the upper protruding portion 423 and the lower protruding portion 424 in the axial direction. Thus, extraction of the motor base 41 in the axial direction is prevented.

Further, in this preferred embodiment, the upper protruding portion 423 and the lower protruding portion 424 are preferably provided on the base body portion 42 instead of the motor base 41. By doing this, a complicated concavo-convex shape including the upper protruding portion and the lower protruding portion need not be provided in the motor base 41, which is preferably a cutting product. Accordingly, the motor base 41 can easily be manufactured.

Further, as shown in FIGS. 3 and 6, in this preferred embodiment, at least a portion of the lower protruding portion 424 radially extends, along the lower surface of the inner bottom plate portion 412, farther radially inward than the inner end portion of the upper protruding portion 423. In the preferred embodiment of FIGS. 3 and 6, the inner end portion in the radial direction of the lower protruding portion 424 reaches an outer circumferential surface of a lower end portion of the bearing mounting portion 411. Thus, the portion of the lower surface of the inner bottom plate portion 412 which is covered by the lower protruding portion 424 is enlarged. As a result, downward extraction of the motor base 41 is more reliably prevented.

Further, as shown in FIGS. 3 and 6, in this preferred embodiment, the circuit board 23 is disposed in a portion of the lower surface of the inner bottom plate portion 412 that is not covered by the lower protruding portion 424. That is, as shown in FIGS. 3 and 6, the lower surface of the inner bottom plate portion 412 of this preferred embodiment preferably includes a first lower surface 61 covered by the lower protruding portion 424, and a second lower surface 62 covered by the circuit board 23. Thus, the vertical position of the lower protruding portion 424 and the vertical position of the circuit board 23 at least partially overlap. Thus, the entire axial thickness of the base plate 21 and the circuit board 23 significantly reduced. As a result, the axial thickness of the motor 11 is also further reduced.

Further, as shown in FIG. 3, in this preferred embodiment, the axial thickness of the circuit board 23 preferably is thinner than the axial thickness of the lower protruding portion. Thus, the lower surface of the circuit board is disposed higher than the lower surface of the lower protruding portion 424. Thus, the axial thickness of the base unit 4 is further reduced.

Further, as shown in FIGS. 3 and 4, the motor base 41 according to this preferred embodiment preferably includes the drawing hole 413. The drawing hole 413 axially penetrates through the inner bottom plate portion 412. As shown in FIG. 3, the conducting wire 521 that extends from the coils 52 reaches a lower surface of the motor base 41 through the drawing hole 413. Particularly, in this preferred embodiment, the drawing hole 413 is provided in the motor base 41, which is preferably made of stainless steel, instead of the base body portion 42, which is preferably made of aluminum. Thus, deterioration of the stiffness due to the drawing hole 413 is prevented.

Further, as shown in FIG. 4, the motor base 41 of this preferred embodiment preferably includes a cut out 414. The cut out 414 extends radially inward from the outer circumferential surface of the inner bottom plate portion 412, and axially penetrates through the inner bottom plate portion 412. During the insert casting, melted aluminum fills the inside of the cut out 414. Accordingly, a portion of the base body portion 42 after casting is disposed inside the cut out 414. As a result, a relative rotation of the motor base 41 and the base body portion is prevented. Further, during the casting, the melted aluminum flows through the cut out 414 in the axial direction. Thus, the melted aluminum easily flows in the axial direction. As a result, the lower protruding portion 424 is more reliably casted.

Further, as shown in FIG. 5, in this preferred embodiment, an adhesive 44 of a sealing material is preferably disposed in the boundary between the lower surface of the motor base 41 and the lower surface of the base body portion 42. It is preferable that the adhesive 44 be continuously connected in an annular shape without a gap. Inflow and outflow of gas in the boundary between the motor base 41 and the base body portion 42 are further significantly reduced and prevented by the adhesive 44. As a result, air tightness of the disk drive apparatus 1 is further improved. Further, a different sealing material instead of the adhesive 44 may alternatively be used. For example, a resin material, other than the adhesive, or an adhesive sheet may be used as the sealing material.

Figure 7:
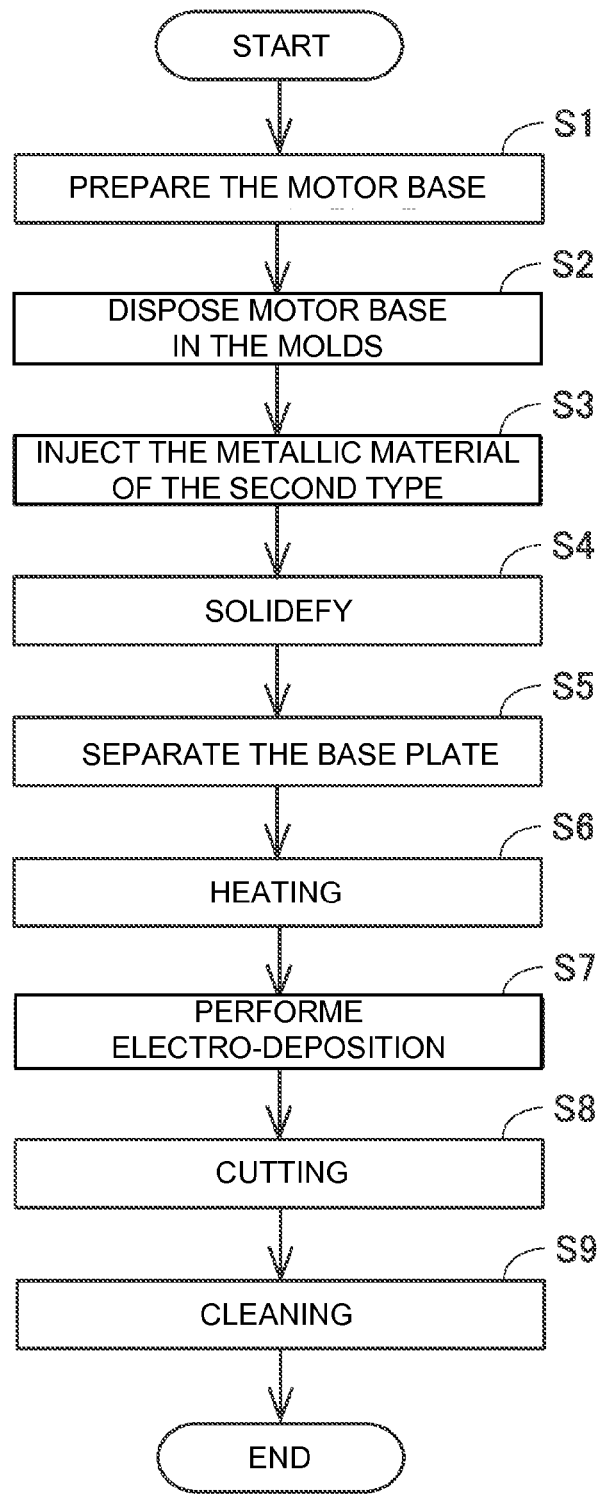
FIG. 7 is a flowchart showing an example of a manufacturing procedure of the base plate according to the second preferred embodiment of the present invention.
Figure 8:
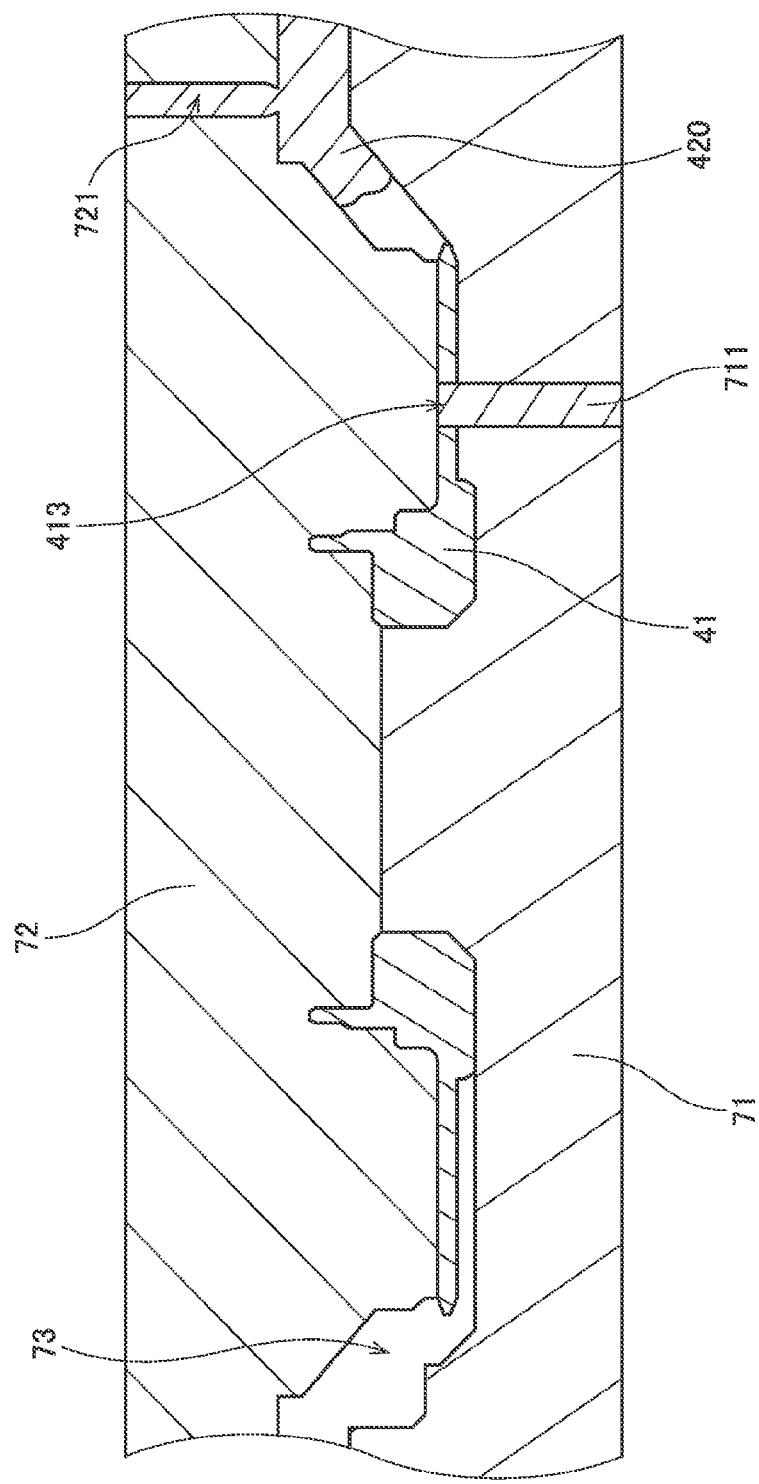
FIG. 8 is a longitudinal sectional view showing a state during the casting of the base plate according to the second preferred embodiment of the present invention.

FIG. 7 is a flowchart showing a manufacturing procedure of the base plate 21 in accordance with a preferred embodiment of the present invention. FIG. 8 is a longitudinal sectional view showing a state during the casting. Hereinafter, the manufacturing procedure of the base plate will be described referring to FIGS. 7 and 8.

When the base plate 21 is manufactured, firstly, a pair of molds 71 and 72 and the motor base 41, which is preferably made of stainless steel, are prepared (step S1). The motor base 41 is preferably manufactured, for example, by cutting. Further, the motor base 41 includes the drawing hole 413 through which the conducting wire 521 passes. The pair of molds 71 and 72 is used, of which opposite surfaces are in contact with each other to thereby define a cavity 73 corresponding to the shape of the base plate 21 therein.

Next, the motor base 41 is disposed in the pair of molds 71 and 72 (step S2). Here, firstly, the motor base 41 is set in one mold 71. Then, an upper portion of the mold 71 is closed by the other mold 72. Thus, the cavity 73 is formed in the molds 71 and 72, and a state where the motor base 41 is disposed in the cavity 73 is obtained.

At this time, a positioning pin 711 that extends from the mold 71 is preferably inserted into the drawing hole 413 of the motor base 41. Thus, the motor base 41 is positioned with respect to the mold 71. In this way, in this preferred embodiment, the positioning of the motor base 41 in the molds 71 and 72 is performed using the drawing hole 413. Thus, a positioning hole or a cut out, besides the drawing hole 413, need not be provided in the motor base 41.

In step S2, the positioning pin 711 may be inserted into a portion of the cut out 414 provided in an outer end portion of the motor base 41. By doing this, positioning of the motor base 41 in the molds 71 and 72 can be performed using the cut out 414. Further, in the portion of the cut out 414 where the positioning pin 711 is inserted, the melted aluminum is not spread during step S3 which will be described later. Accordingly, the conducting wire 521 can be drawn using the cut out 414. By doing this, the drawing hole 413 can be omitted.

Subsequently, the melted aluminum 420 is injected in the cavity 73 of the molds 71 and 72 (step S3). Here, as shown in FIG. 8, the melted aluminum 420 is preferably injected to the cavity 73 of the molds 71 and 72 through a gate 721 provided in the mold 72. The injected aluminum 420 fills a space that extends radially outward from the motor base 41.

After the melted aluminum 420 is spread in the cavity 73 of the molds 71 and 72, the melted aluminum 420 in the molds 71 and 72 are cooled and solidified (step S4). The aluminum 420 in the molds 71 and 72 is solidified to thereby form the base body portion 42 that is a casting product. Further, according to the solidification of the aluminum 420, the motor base 41 and the base body portion 42 are fixed to each other. As a result, the base plate 21 is obtained.

Thereafter, the pair of molds 71 and 72 is opened and the base plate 21 is separated from the molds 71 and 72 (step S5).

The above-described steps S1 to S5 correspond to a procedure that is an example of insert casting. During the insert casting, the casting of the base body portion 42 and the fixing of the motor base 41 and the base body portion 42 are simultaneously performed. Thus, as compared with a case where the motor base 41 and the base body portion 42 are individually manufactured and are fixed to each other, a total number of manufacturing processes of the base plate 21 is reduced.

The base plate 21 after casting is brought in a heating tank and is then heated (step S6). As the base plate 21 is heated, stress occurring in a contact portion of the motor base 41 and the base body portion 42 is reduced due to expansion of the motor base 41 and the base body portion 42. As a result, distortion of the motor base 41 and the base body portion 42 is significantly reduced and prevented.

Next, electro-deposition is preferably performed on a surface of the base plate 21 (step S7). Here, the base plate 21 is immersed in a coating material and a current flows between the coating material and the base plate, and thus, the coating material is deposited to the surface of the base plate 21. Then, a portion of the surface of the base plate 21 where accuracy is particularly necessary is preferably cut (step S8). Thus, the corresponding portion of the base plate 21 is finished with high accuracy. Finally, the base plate 21 is cleaned and dried (step S9), so that the base plate 21 is completely manufactured.

Figure 9:
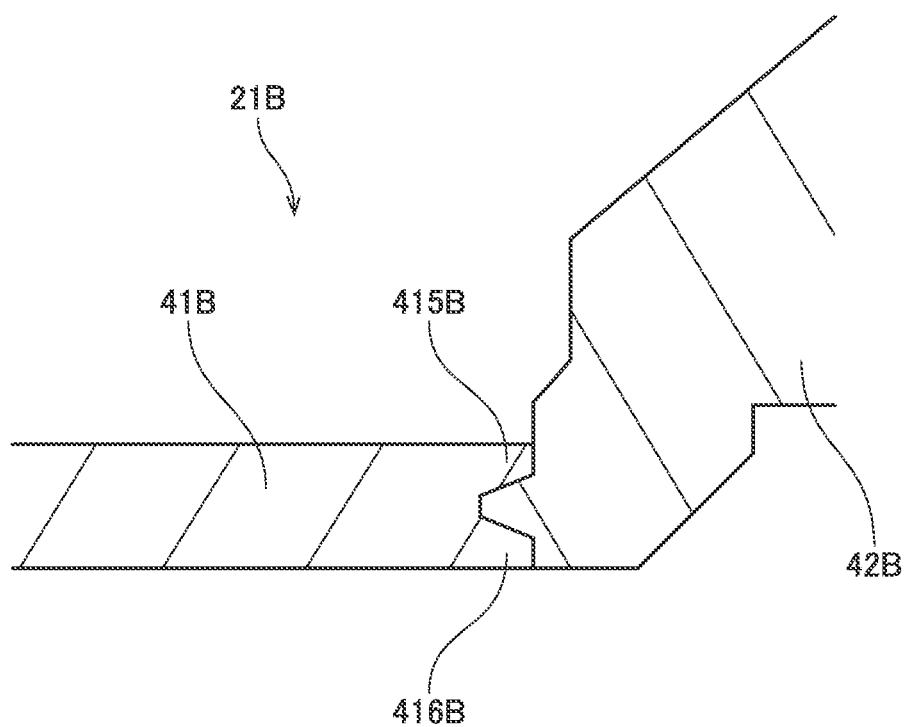
FIG. 9 is a partial longitudinal sectional view of a base plate according to a modified preferred embodiment of the present invention.

FIG. 9 is a partial longitudinal sectional view of a base plate 21B according to a modified preferred embodiment of the present invention. In FIG. 9, an upper protruding portion 415B and a lower protruding portion 416B are preferably provided in an outer end portion of a motor base 41B. The upper protruding portion 415B is in contact with an upper surface of an inner end portion of a base body portion 42B and the lower protruding portion 416B is in contact with a lower surface of the inner end portion of the base body portion 42B. That is, the inner end portion of the base body portion 42B is wedged between the upper protruding portion 415B and the lower protruding portion 416B in the axial direction. Thus, extraction of the motor base 41B in the axial direction is prevented.

Further, in the preferred embodiment of FIG. 9, the upper protruding portion 415B and the lower protruding portion 416B are preferably provided on the motor base 41B, instead of the base body portion 42B. By doing this, a thin portion of the base body portion 42B that is a casting product can be reduced.

Figure 10:
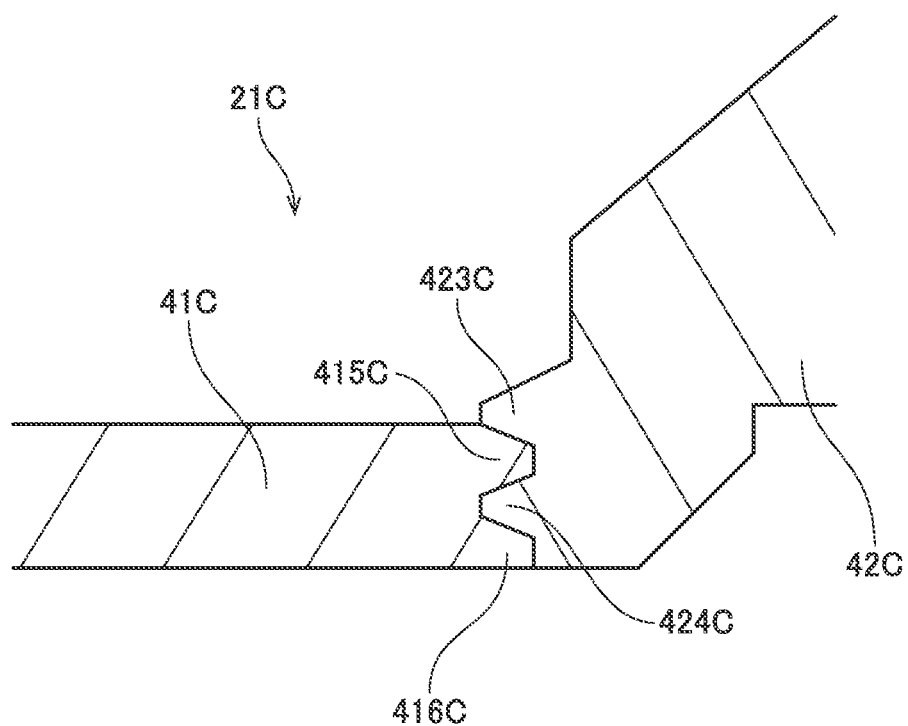
FIG. 10 is a partial longitudinal sectional view of a base plate according to a modified preferred embodiment of the present invention.

FIG. 10 is a partial longitudinal sectional view of a base plate 21C according to another modified preferred embodiment of the present invention. In FIG. 10, an upper protruding portion 415C and a lower protruding portion 416C that protrude radially outward are preferably provided in an outer end portion of a motor base 41C. Further, an upper protruding portion 423C and a lower protruding portion 424C that protrude radially inward are preferably provided in an inner end portion of a base body portion 42C. Further, the upper protruding portion 415C and the lower protruding portion 416C of the motor base 41C, and the upper protruding portion 423C and the lower protruding portion 424C of the base body portion 42C are engaged with each other.

In the preferred embodiment of FIG. 10, the upper protruding portion 415C of the motor base 41C is in contact with an upper surface of the lower protruding portion 424C of the base body portion 42C. Further, the lower protruding portion 416C of the motor base 41C is in contact with a lower surface of the lower protruding portion 424C of the base body portion 42C. Further, the upper protruding portion 423C of the base body portion 42C is in contact with an upper surface of the upper protruding portion 415C of the motor base 41C. Further, the lower protruding portion 424C of the base body portion 42C is in contact with a lower surface of the upper protruding portion 415C of the motor base 41C. Thus, extraction of the motor base 41C in the axial direction can more reliably be prevented as compared to other preferred embodiments of the present invention.

Figure 11:
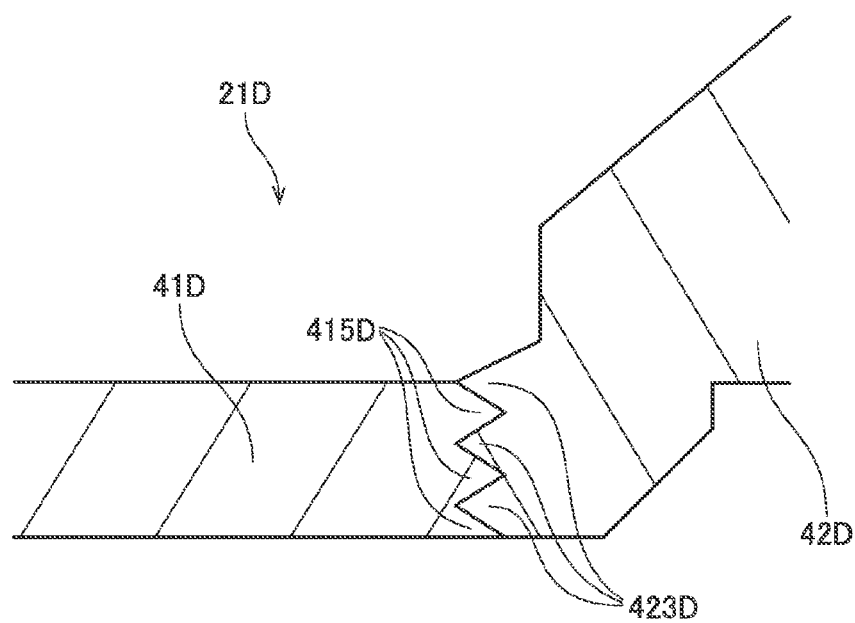
FIG. 11 is a partial longitudinal sectional view of a base plate according to a modified preferred embodiment of the present invention.

FIG. 11 is a partial longitudinal sectional view of a base plate 21D according to yet another modified preferred embodiment of the present invention. In FIG. 11, a plurality of protruding portions 415D that protrudes radially outward is preferably provided in an outer end portion of a motor base 41D. Further, a plurality of protruding portions 423D that protrudes radially inward is preferably provided in an inner end portion of a base body portion 42D. Further, the plurality of protruding portions 415D of the motor base 41D and the plurality of protruding portions 423D of the base body portion 42D are engaged with each other. Thus, extraction of the motor base 41D in the axial direction can more reliably be prevented as compared to other preferred embodiments of the present invention.

As described above, at least one set of upper protruding portion and lower protruding portion may be provided in at least one of the outer end portion of the motor base and the inner end portion of the base body portion. Further, the upper protruding portion may be in contact with the upper surface of the other one of the outer end portion of the motor base and the inner end portion of the base body portion, and the lower protruding portion may be in contact with the lower surface of the other one of the outer end portion of the motor base and the inner end portion of the base body portion.

Figure 12:
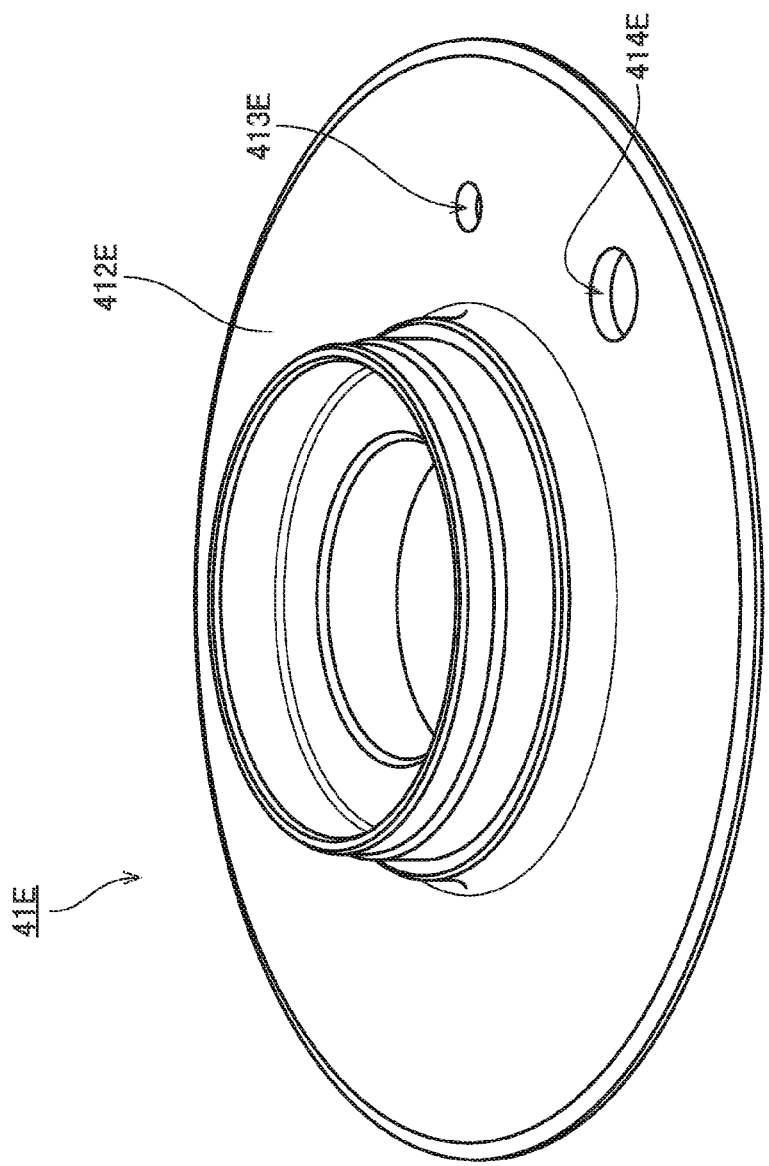
FIG. 12 is a perspective view of a motor base according to a modified preferred embodiment of the present invention.

FIG. 12 is a perspective view of a motor base 41E according to yet another modified preferred embodiment of the present invention. The motor base 41E in FIG. 12 preferably includes a through hole 414E in addition to a drawing hole 413E. The through hole 414E axially penetrates through an inner bottom plate portion 412E. During the insert casting, melted aluminum, for example, fills the through hole 414E. Accordingly, a portion of the base body portion after casting is disposed in the through hole 414E. As a result, relative rotation of the motor base 41E and the base body portion is prevented.

Figure 13:
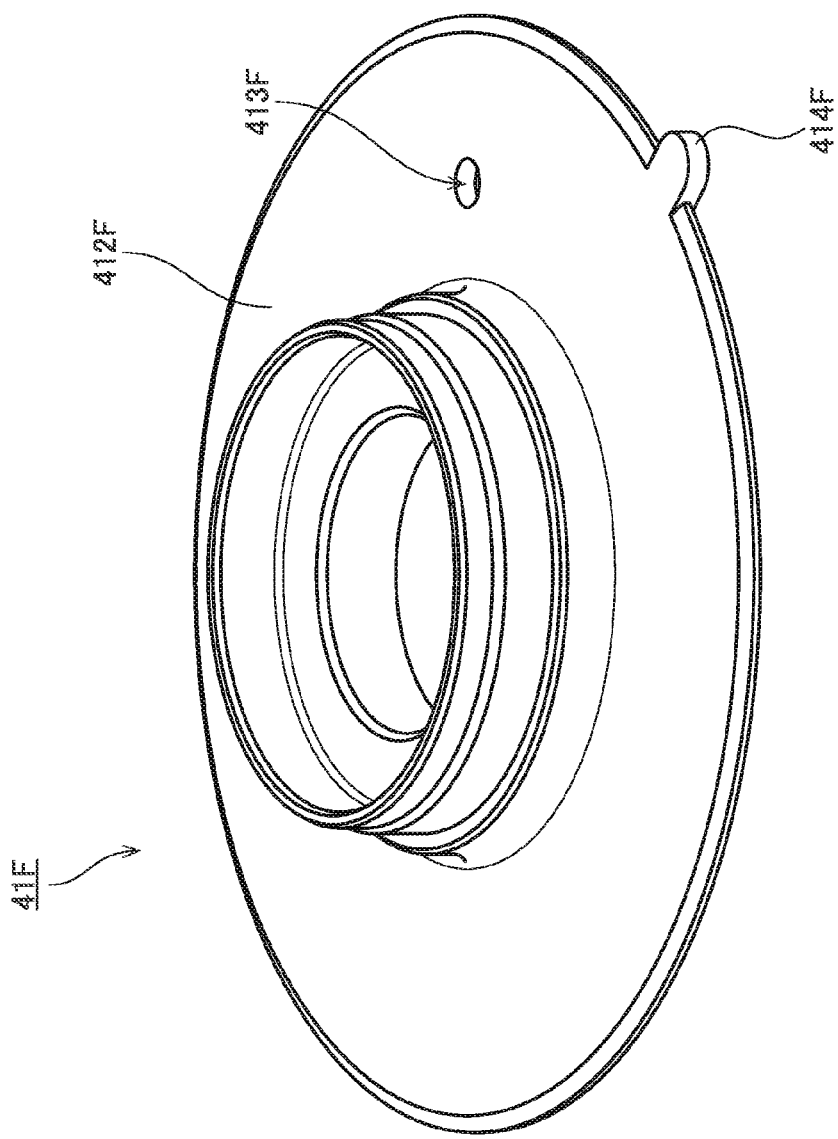
FIG. 13 is a perspective view of a motor base according to a modified preferred embodiment of the present invention.

FIG. 13 is a perspective view of a motor base 41F according to yet another modified preferred embodiment of the present invention. The motor base 41F in FIG. 13 includes a drawing hole 413F and a protrusion 414F. The protrusion 414F extends radially outward from an outer circumferential surface of an inner bottom plate portion 412F. During the insert casting, melted aluminum encloses the protrusion 414F. A portion of the base body portion after casting is in contact with both circumferential end surfaces of the protrusion 414F. As a result, relative rotation of the motor base 41F and the base body portion is prevented.

Figure 14:
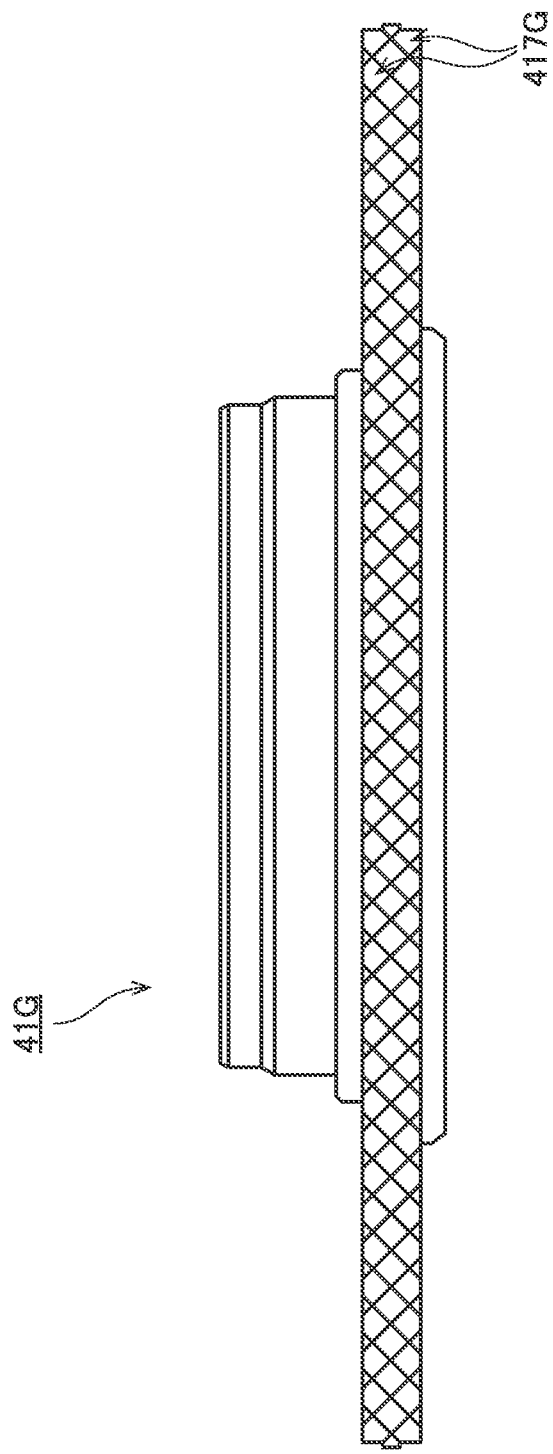
FIG. 14 is a side view of a motor base according to a modified preferred embodiment of the present invention.

FIG. 14 is a side view of a motor base 41G according to yet another modified preferred embodiment. The motor base 41G of FIG. 14 preferably includes a plurality of concavities 417G on an outer circumferential surface of an inner bottom plate portion of the motor base 41G. During the insert casting, melted aluminum, for example, flows into the concavities 417G. Accordingly, the base body portion after casting includes portions disposed in the plurality of concaves 417G. As a result, relative rotation of the motor base 41G and the base body portion is prevented. Further, extraction of the motor base 41G in the axial direction is more reliably prevented as compared to other preferred embodiments of the present invention.

Figure 15:
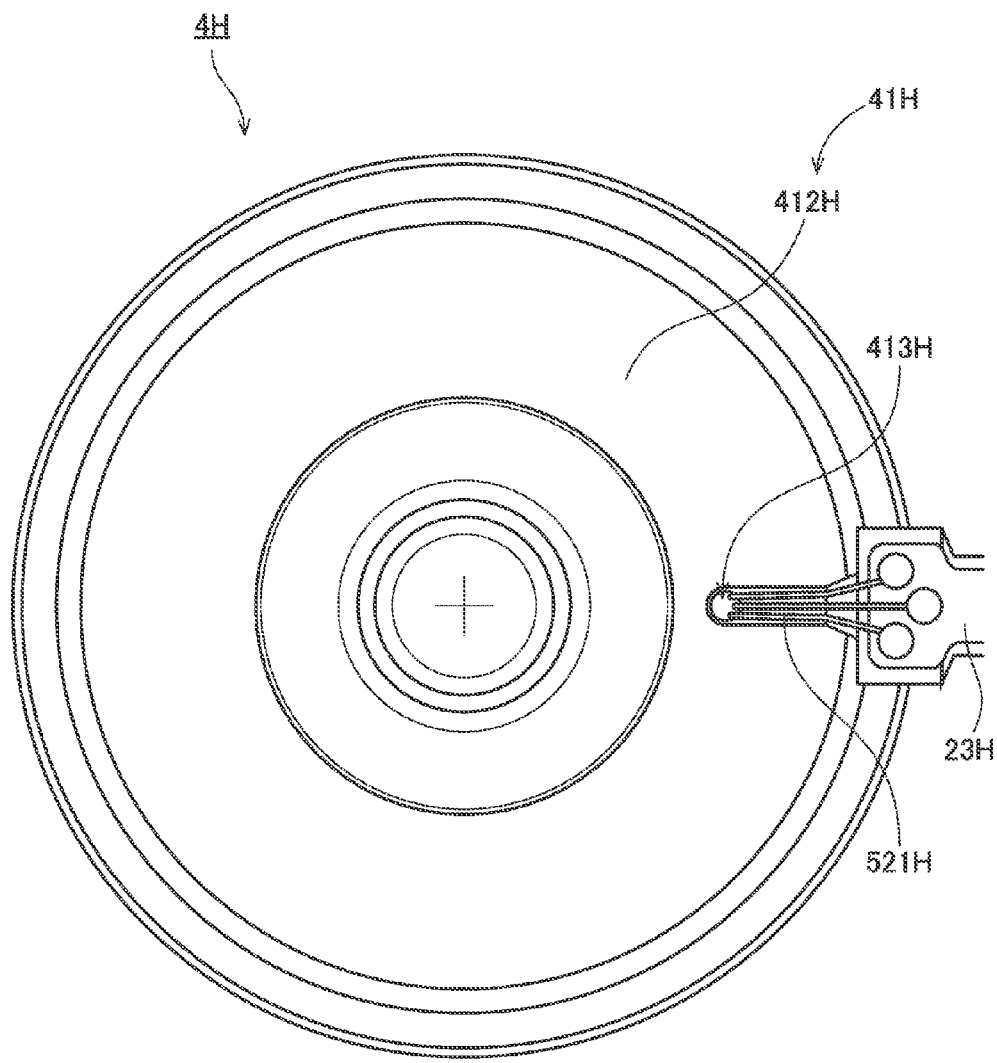
FIG. 15 is a partial bottom view of a base unit according to a modified preferred embodiment of the present invention.
Figure 16:
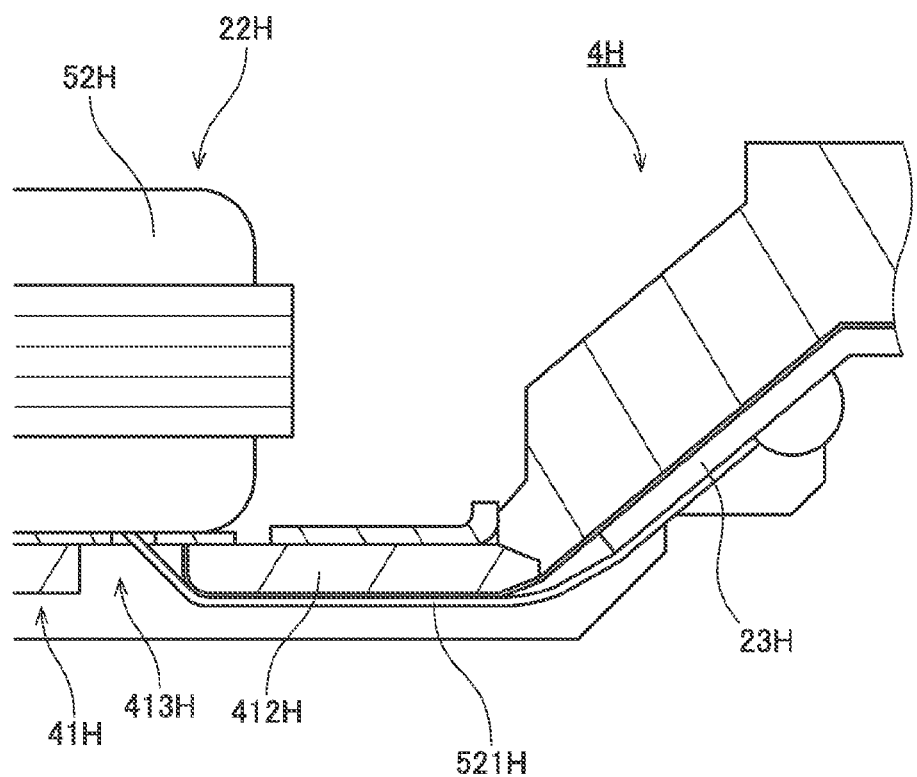
FIG. 16 is a partial longitudinal sectional view of a base unit according to a modified preferred embodiment of the present invention.

FIG. 15 is a partial bottom view of a base unit 4H according to yet another modified preferred embodiment of the present invention. FIG. 16 is a partial longitudinal sectional view of the base unit 4H. In FIGS. 15 and 16, a circuit board 23H is disposed farther radially outward than the motor base 41H. A conducting wire 521H drawn from a coil 52H passes through a drawing hole 413H, and then, extends radially outward along a lower surface of an inner bottom plate portion 412H. Further, the circuit board 23H is soldered in the radially outer side of the motor base 41H.

By doing this, a stator 22H and the circuit board 23H can be disposed in substantially the same vertical position without overlapping in the axial direction. Accordingly, the entire axial thickness of the motor can be further significantly reduced.

The base plate according to the preferred embodiments of the present invention and modifications thereof may be applied to various disk drive apparatuses. The disk drive apparatus may rotate a disk other than a magnetic disk, for embodiments of the present invention and modifications thereof, it is possible to reduce the size of the disk drive apparatus in the axial direction. Accordingly, the preferred embodiments of the present invention and modifications thereof are particularly useful in a base plate used in a disk drive apparatus for a thin notebook PC or a tablet PC. Specifically, preferred embodiments of the present invention are particularly useful in a base plate for use in a disk drive apparatus of a type of 2.5" and a thickness of about 7 mm or less. The disk drive apparatus of the thickness of about 7 mm or less includes, for example, a disk drive apparatus of a thickness of about 7 mm, a disk drive apparatus of a thickness of about 5 mm, and a disk drive apparatus of a thickness of about 3 mm.

Further, in the above preferred embodiments and modifications thereof, a so-called outer rotor motor in which a magnet is disposed outside a stator in the radial direction has been described. However, the motor according to the preferred embodiments of the present invention and modifications thereof may also be a so-called inner rotor motor in which a magnet is disposed inside a stator in the radial direction.

Further, in the above preferred embodiments of the present invention and modifications thereof, a so-called shaft rotating motor in which a sleeve belongs to a stationary portion and a shaft belongs to a rotating portion has been described. However, the motor according to the present invention may be a so-called fixed shaft motor in which a shaft belongs to a stationary portion and a sleeve belongs to a rotating portion. In the case of the fixed shaft motor, the shaft may be fixed to a bearing mounting portion.

Further, the shapes of detailed portions and elements of respective members may be different from the shapes shown in the respective drawings of the description. For example, the motor base may be defined by a plurality of members. Further, the outer end portion of the motor base may be disposed outside the outer end portion of the hub in the radial direction. Further, the drawing hole of the motor base may be formed after insert casting, if so desired.

Further, electro-deposition with an insulating layer is preferably performed on the surface of the base plate, however, the insulating layer is not limited to this. For example, an insulating layer may alternatively be formed on the surface of the base plate by plating.

Features of the above-described preferred embodiments and the modifications thereof may be combined appropriately as long as no conflict arises.

The preferred embodiments of the present invention and modifications thereof may be applied to a base plate, a base unit, a motor, a disk drive apparatus, and a method of manufacturing the base plate.

While preferred embodiments of the present invention and modifications thereof have been described above, it is to be understood that variations and further modifications will be apparent to those skilled in the art without departing from the scope and spirit of the present invention. The scope of the present invention, therefore, is to be determined solely by the following claims.

What is claimed is:

1. A base plate of a disk drive apparatus which rotates a disk centered on a central axis which extends vertically, the base plate comprising:
   a motor base which is disposed around the central axis and is made of a metallic material of a first type; and
   a base body portion which extends radially outward of the motor base and is made of a metallic material of a second type; wherein
   a Young's modulus of the metallic material of the first type is larger than a Young's modulus of the metallic material of the second type;
   the motor base is at least partially embedded and insert-casted within the base body portion;
   the motor base includes:
      a bearing mounting portion of a cylindrical or an approximately cylindrical shape which axially extends around the central axis;
      a bottom plate portion which extends radially outward from a lower portion of the bearing mounting portion; and
      a drawing hole which penetrates through the bottom plate portion;
   one of an outer end portion of the bottom plate portion and an inner end portion of the base body portion which is in contact with the outer end portion includes:
      an upper protruding portion which is in contact with an upper surface of the other of the outer end portion of the bottom plate portion and the inner end portion of the base body portion; and
      a lower protruding portion which is in contact with a lower surface of the other of the outer end portion of the bottom plate portion and the inner end portion of the base body portion; and
   a portion of a radially outer end of the bottom plate portion and a portion of a radially inner end of the base body portion overlap one another axially at a location radially outward from the drawing hole.

2. The base plate according to claim 1, wherein the base body portion includes:
   the upper protruding portion which is in contact with the upper surface of the outer end portion of the bottom plate portion; and
   the lower protruding portion which is in contact with the lower surface of the outer end portion of the bottom plate portion.

3. The base plate according to claim 2, wherein at least a portion of the lower protruding portion extends farther radially inward than an inner end portion of the upper protruding portion.

4. The base plate according to claim 1, wherein the motor base includes:
   the upper protruding portion, which is in contact with the upper surface of the inner end portion of the base body portion; and
   the lower protruding portion, which is in contact with the lower surface of the inner end portion of the base body portion.

5. The base plate according to claim 1, wherein
   the motor base includes a protrusion which extends radially outward from an outer circumferential surface of the bottom plate portion; and
   the base body portion is in contact with both circumferential end surfaces of the protrusion.

6. The base plate according to claim 1, wherein
   the motor base includes a plurality of concave portions in an outer edge surface of the bottom plate portion; and
   the base body portion includes portions which are disposed inside the plurality of concave portions.

7. The base plate according to claim 1, further comprising a sealing material which is disposed in a boundary portion between a lower surface of the motor base and a lower surface of the base body portion.

8. A base unit comprising:
   the base plate according to claim 1; and
   a stator that is disposed above the base plate; wherein
   a conducting wire which extends from the stator and reaches a lower surface of the base plate through the drawing hole.

9. The base unit according to claim 8, wherein
   the stator includes a coil; and
   an outer end portion of the motor base is disposed farther radially outward than an outer end portion of the coil.

10. A motor comprising:
   the base unit according to claim 8;
   a bearing mechanism which is accommodated inside the bearing mounting portion; and
   a rotating portion which is supported by the bearing mechanism and rotates centered on the central axis.

11. A disk drive apparatus of a type of 2.5" and a thickness of about 7 mm or less, comprising:
the motor according to claim 10;
a cover which covers an upper portion of the base unit; and
at least one disk which is held by the rotating portion.

12. A base plate of a disk drive apparatus which rotates a disk centered on a central axis which extends vertically, the base plate comprising:
a motor base which is disposed around the central axis and is made of a metallic material of a first type; and
a base body portion which extends radially outward of the motor base and is made of a metallic material of a second type; wherein
a Young's modulus of the metallic material of the first type is larger than a Young's modulus of the metallic material of the second type;
the motor base is at least partially embedded and insert-casted within the base body portion;
the motor base includes:
a bearing mounting portion of a cylindrical or an approximately cylindrical shape which axially extends around the central axis; and
a bottom plate portion which extends radially outward from a lower portion of the bearing mounting portion;
one of an outer end portion of the bottom plate portion and an inner end portion of the base body portion which is in contact with the outer end portion includes:
an upper protruding portion which is in contact with an upper surface of the other of the outer end portion of the bottom plate portion and the inner end portion of the base body portion; and
a lower protruding portion which is in contact with a lower surface of the other of the outer end portion of the bottom plate portion and the inner end portion of the base body portion;
the motor base includes a cutout portion which extends radially inward from an outer circumferential surface of the bottom plate portion and penetrates through the bottom plate portion in the axial direction; and
a portion of the base body portion is disposed inside the cutout portion.

13. A base plate of a disk drive apparatus which rotates a disk centered on a central axis which extends vertically, the base plate comprising:
a motor base which is disposed around the central axis and is made of a metallic material of a first type; and
a base body portion which extends radially outward of the motor base and is made of a metallic material of a second type; wherein
a Young's modulus of the metallic material of the first type is larger than a Young's modulus of the metallic material of the second type;
the motor base is at least partially embedded and insert-casted within the base body portion;
the motor base includes:
a bearing mounting portion of a cylindrical or an approximately cylindrical shape which axially extends around the central axis; and
a bottom plate portion which extends radially outward from a lower portion of the bearing mounting portion;
one of an outer end portion of the bottom plate portion and an inner end portion of the base body portion which is in contact with the outer end portion includes:
an upper protruding portion which is in contact with an upper surface of the other of the outer end portion of the bottom plate portion and the inner end portion of the base body portion; and
a lower protruding portion which is in contact with a lower surface of the other of the outer end portion of the bottom plate portion and the inner end portion of the base body portion;
the motor base includes a through hole which axially penetrates through the bottom plate portion; and
a portion of the base body portion is disposed inside the through hole.

14. A base unit, comprising:
a base plate including:
a motor base which is disposed around the central axis and is made of a metallic material of a first type; and
a base body portion which extends radially outward of the motor base and is made of a metallic material of a second type; and
a stator that is disposed above the base plate; wherein
a Young's modulus of the metallic material of the first type is larger than a Young's modulus of the metallic material of the second type;
the motor base is at least partially embedded and insert-casted within the base body portion;
the motor base includes:
a bearing mounting portion of a cylindrical or an approximately cylindrical shape which axially extends around the central axis; and
a bottom plate portion which extends radially outward from a lower portion of the bearing mounting portion; and
one of an outer end portion of the bottom plate portion and an inner end portion of the base body portion which is in contact with the outer end portion includes:
an upper protruding portion which is in contact with an upper surface of the other of the outer end portion of the bottom plate portion and the inner end portion of the base body portion; and
a lower protruding portion which is in contact with a lower surface of the other of the outer end portion of the bottom plate portion and the inner end portion of the base body portion;
the motor base includes a drawing hole which penetrates through the bottom plate portion;
a conducting wire which extends from the stator and reaches a lower surface of the base plate through the drawing hole, the base unit further including a circuit board to which the conducting wire is connected; and
a lower surface of the bottom plate portion includes:
a first lower surface which is covered by the base body portion; and
a second lower surface which is covered by the circuit board.

* * * * *